United States Patent [19]

Pairaud et al.

[11] 4,348,423

[45] Sep. 7, 1982

[54] METHOD OF PREPARING A COCOA BUTTER SUBSTITUTE

[75] Inventors: David J. Pairaud; Sandro Musso; Catherine Bouvron née Ferrenbach; Xavier J. M. Pagés-Xatart Parès, all of Abidjan, Ivory Coast

[73] Assignee: Blohorn, S.A., Abidjan, Ivory Coast

[21] Appl. No.: 197,128

[22] Filed: Oct. 15, 1980

[51] Int. Cl.$^3$ .............................................. A23D 5/02
[52] U.S. Cl. .................................................. 426/607
[58] Field of Search ................................. 426/606, 607

[56] References Cited

U.S. PATENT DOCUMENTS

| 2,975,060 | 3/1961 | Best et al. | 426/607 |
| 3,012,891 | 12/1961 | Best et al. | 426/607 |
| 3,084,049 | 4/1963 | Sinnema | 426/607 |
| 4,157,405 | 6/1979 | Yasuda et al. | 426/607 |
| 4,219,584 | 8/1980 | Mori et al. | 426/607 |

*Primary Examiner*—Robert A. Yoncoskie
*Attorney, Agent, or Firm*—Brisebois & Kruger

[57] ABSTRACT

A method of preparing a cocoa butter substitute comprises preparing a fat A having more than 40% by weight of $C_{16}$ and $C_{18}$ fatty acids and selected from shea butter, mango kernel fat, Borneo tallow, sal, kokum and mahua, mixing the fat A with palm oil, and fractionating this mixture in a solvent medium, wherein the mixture contains 35 to 45 parts of fat A with 65 to 55 parts by weight of a palm oil fraction B containing more than 50% by weight of triglycerides of the palmitic-oleic-palmitine (POP) type and less than 1% by weight of trisaturated triglycerides.

7 Claims, 3 Drawing Figures

METHOD OF PREPARING A COCOA BUTTER SUBSTITUTE

The present invention relates to a method of preparing a cocoa butter substitute, suitable for use in the manufacture of chocolate.

It is known that natural cocoa butter is an expensive raw material and is used in large quantities for the manufacture of chocolate. Attempts have therefore been made to produce substitutes for natural cocoa butter, and numerous substitutes have been proposed, some of these being available commercially at present. In order for a cocoa butter substitute to be completely satisfactory, it must fulfill several requirements; in the first instance, its cost price should be lower than that of natural cocoa butter and therefore its method of manufacture must be relatively simple; secondly, the physical properties of the substitute must be comparable with those of natural cocoa butter as, if this is not the case, the substitution of natural cocoa butter may only be carried out with considerable modifications to the manufacturing apparatus; thirdly, the fatty acid and triglyceride content of the substitute must be as close as possible to that of natural cocoa butter so that the organoleptic properties of the two products are comparable.

The present invention relates to a new method of obtaining a cocoa butter substitute which enables, in a simple manner, the obtention of a substitute having physical properties which are extremely close to those of natural cocoa butter. Comparison of the physical properties is carried out by comparing the cooling curves of the products, the differential calorimetric analysis curves and curves giving the percentage of liquid as a function of temperature. Although the present invention aims to provide a substitute having physical properties which are essentially very comparable with those of natural cocoa butter, it has also been established that the physico-chemical or chemical properties of the substitute are very close to those of natural cocoa butter, in particular in respect of iodine and saponification indices, and fatty acid and glyceride content.

It has already been proposed to use shea butter or like fats in order to produce cocoa butter substitutes. In all the methods previously disclosed, it has been proposed to fractionate the raw shea matter and, in certain cases, it has been proposed to fractionate other raw materials and then to mix these fractions with the shea butter fraction. It is known, however, that natural fats are complex mixtures such that when two fats or two fractions are mixed, the physical properties of the mixture at various temperatures can never be determined in advance in a simple manner from the properties of the two fats or fractions which have been mixed. Consequently all the methods previously proposed, in which previously produced fractions are mixed having regard to the chemical compositions of these fractions and the required final chemical composition of the substitute, enable satisfactory regulation of the fatty acid and triglyceride contents but do not enable complete similarity of the physical properties of the substitute and those of natural cocoa butter to be obtained, in particular in respect of behaviour under the effect of heat.

The present invention provides a method of preparing a cocoa butter substitute, comprising preparing a fat A having more than 40% by weight of $C_{16}$ and $C_{18}$ fatty acids and selected from shea butter, mango kernel fat, Borneo tallow (*Shorea stenoptera* or *Pentadesma butyracea*), sal (*Shorea robusta*), kokum (*Garcinia indica*) and mahua (*Madhuca latifolia*), mixing the fat A with with palm oil, and fractionating the said mixture in a solvent medium, wherein the mixture contains 35 to 45 parts of fat A with 65 to 55 parts by weight of a plam oil fraction B containing more than 50% by weight of triglycerides of the palmitic-oleic-palmitine (POP) type and less than 1% by weight of trisaturated triglycerides.

According to the present invention, the substitute is obtained from two raw materials which are mixed, this mixture then undergoing a final fractionation in conditions which enable the production of a substitute which is very close to natural cocoa butter in terms of its physical behaviour. The product isolated in this way by a final fractionation of a mixture (and not by a final mixture of fractions) has physical characteristics which are advantageous presumably as a result of the natural arrangement of the various triglycerides which were present initially.

The present invention thus provides a new method for the preparation of a cocoa butter substitute having physical properties which are very close to those of natural cocoa butter, this method comprising preparing a fat A having more than 40% by weight of saturated $C_{16}$ and $C_{18}$ fatty acids and coming from a vegetable matter included in the group which comprises shea butter, mango kernel fat, Borneo tallow (*Shorea stenoptera* or *Pentadesma butyracea*), sal (*Shorea robusta*), kokum (*Garcinia indicia*) and mahua (*Madhuca latifolia*), mixing fat A with palm oil, and fractionating this mixture in a solvent medium; according to the invention the mixture contains 35 to 45 parts of fat A with 65 to 55 parts by weight of a plam oil fraction B containing more than 50% by weight of triglycerides of the palmitic-oleicpalmitine (POP) type and less than 1% by weight of trisaturated triglycerides.

In a preferred embodiment, the fat A used in the method of the invention is subjected to a preliminary neutralisation and/or washing and/or decolouration treatment. Fat A may be a whole shea butter or a shea butter which has been subjected to a preliminary fractionation in order to separate a specific portion having a high content of non-saponifying matter; fractionation of this type may, for example, be carried out in hexane. when fat A is a shea butter, the following preliminary treatment is advantageously carried out; the shea butter is subjected to the action, at a temperature of from 75° C. to 95° C., of an acid such as phosphoric acid or acetic acid added at a rate of 0.1 to 0.5% by weight with respect of the weight of the fat A to be treated, this action being followed by neutralisation by means of a base, elimination of the neutralisation paste, washing with water, drying and a treatment by mixing with 0.1 to 2% by weight of decolouring earth, the fat being finally filtered.

In a preferred method of the fractionation stage ina solvent medium, 100 parts of the above mixture of fat A and palm oil fraction B are added to 250 to 500 parts by weight of solvent, the whole being subjected to conditions which enable a substantially homogeneous phase to be obtained after complete dissolution; the mixture is then cooled slowly to a temperature T of from −4° to −8° C. and the solid fraction which precipitates is recovered and constitutes the substitute. Hexane or acetone may be advantageously used as solvents; the action of the solvent is preferably carried out with stirring at a temperature of from 25° C. to 45° C.

The solid fraction precipitated after cooling of the mixture is preferably washed substantially at the temperature T by means of the solvent used in the fractionation stage, the solvent being then eliminated and the solid being subjected to deodorization.

The present invention also relates to the new industrial product constituted by a cocoa butter substitute obtained by the method according to the invention. It has been observed that this substitute has physical properties which are extremely close to those of natural cocoa butter.

The present invention also relates to a particular use of the cocoa butter substitute obtained by the method according to the invention in the manufacture of chocolate; in this use 5 to 20% by weight of the cocoa butter substitute of the invention is mixed with 95 to 80% by weight of natural cocoa butter to obtain a fat which is used for the manufacture of chocolate.

The invention will be further described with reference to the following illustrative Example. Reference will also be made to the accompanying drawings which show curves indicating the physical properties of the substitute prepared in accordance with the example and a natural cocoa butter, the corresponding characteristics of three cocoa butter substitutes which are at present commercially available being given for comparison purposes.

In the drawings:

FIGS. 1a to 1k show cooling curves (Prichard curves) for cocoa butter and some cocoa butter substitutes with:

FIG. 1a showing the cooling curve for cocoa butter alone;

FIG. 1b showing the cooling curve for a substitute according to the invention;

FIGS. 1c to 1h showing the cooling curves for mixtures of cocoa butter with the substitute of the invention comprising 10%, 15%, 20%, 30%, 40%, and 70% respectively of the mixtures;

In order to obtain fat A used in the method of the invention, 100 kg of shea butter having an acidity of 3% were used in this example. The shea butter was brought to a temperature of 90° C. and 0.30% by weight of 85% phosphoric acid was added. The mixture obtained was stirred vigorously for 15 mins, the temperature being maintained at 90° C. 1.1 kg of soda diluted to 20% in water was then added, stirring was reduced and the mixture was left to react for 10 minutes while maintaining the temperature. The mixture was then left to rest and then the neutralisation paste was separated off. The butter was then washed with 10% by weight of brine containing 10% be weight of sodium chloride; the water was eliminated and the washing was repeated 3 times in the same way.

The material obtained was then brought to a temperature of 90° C. and 1% by weight of decolouring earth was added; the mixture was left to react for 30 mins at an absolute pressure of 60 millibars; the material was then filtered under heat and fat A was obtained. Its $C_{16}$ and $C_{18}$ fatty acid content was as follows:

$C_{16}$ content: 7%
$C_{18}$ content: 37% (stearic)

A refined palm oil fraction was then prepared as indicated above for the shea butter and fractionated in a known manner by crystallisation enabling a solid fraction to be separated. The liquid fraction used comprised 55% of triglycerides of the palmito-oleopalmitine type and 0.5% of trisaturated triglycerides. 40 kg of the previously prepared fat A and 60 kg of the palm oil fraction B given above were mixed together. This mixture was brought to a temperature of 35° C. and 400 liters of hexane were added. Stirring was carried out to obtain a homogeneous phase and the medium was cooled slowly so as to obtain, after 5 hours, a substantially uniform temperature of −6° C. It was observed that a solid fraction was precipitated, which fraction was collected on a rotary filter. The solid fraction obtained in this way was washed with hexane at a temperature of −6° C. The residual hexane was then eliminated from this solid fraction and the product obtained was subjected to known deodorization. The cocoa butter substitute of the invention was obtained in this way. The product obtained had chemical and physico-chemical characteristics as follows.

| Glyceride composition by molecular weight | | Fatty acid composition | |
|---|---|---|---|
| C 48 | 2.8% | C 14 | 0.3% |
| C 50 | 33.9% | C 16 | 30.8% |
| C 52 | 23.8% | C 18 | 29.3% |
| C 54 | 39.5% | C 18' | 36.0% |
| | | C 18" | 4.0% |

Iodine index 40.0
Saponification index 192

Figure 1A:
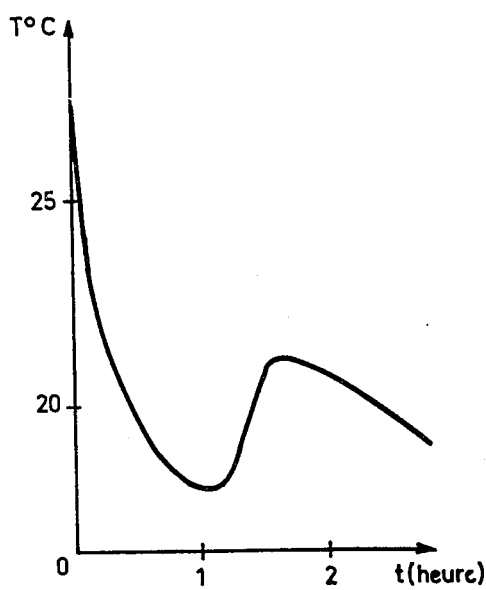
FIGS. 1i, 1j and 1k, show the cooling curves for known cocoa butter substitutes available under the names COBERINE, CHOCOLINE and CALVETTA, respectively.
Figure 1B:
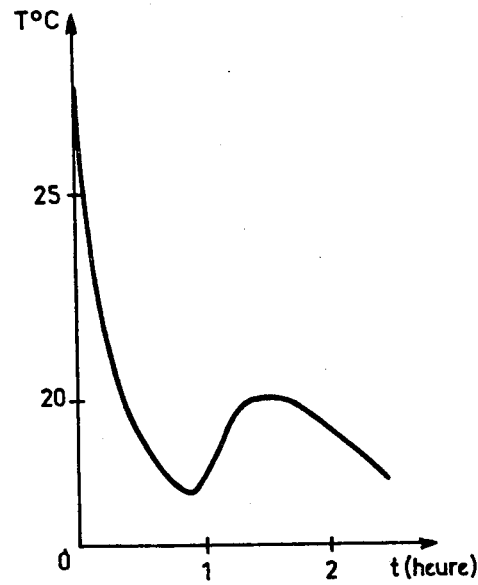
Figure 1C:
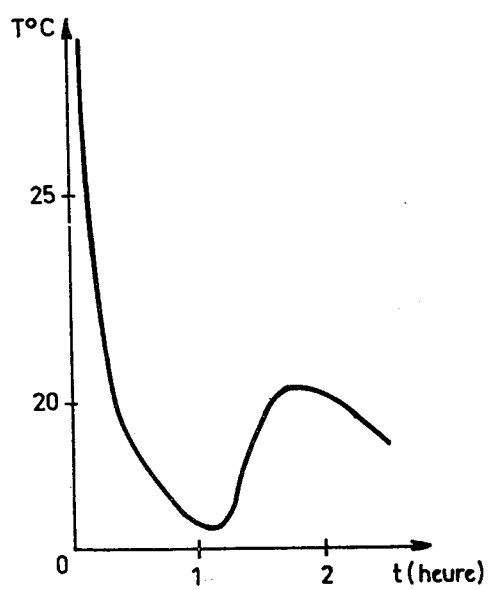
Figure 1D:
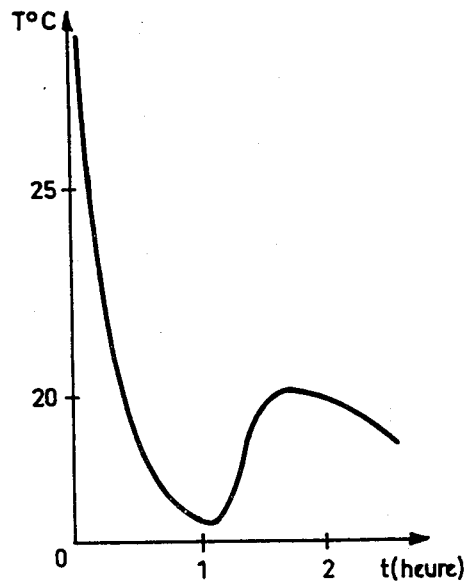
Figure 1E:
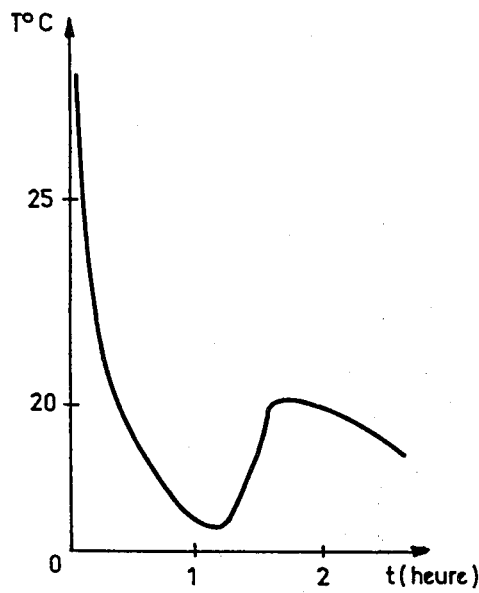
Figure 1F:
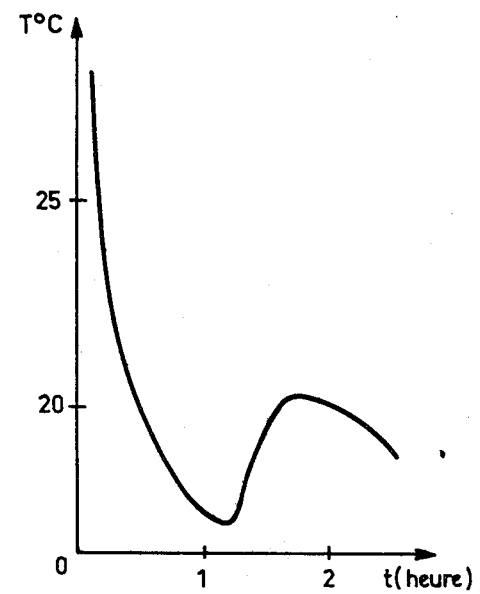
Figure 1G:
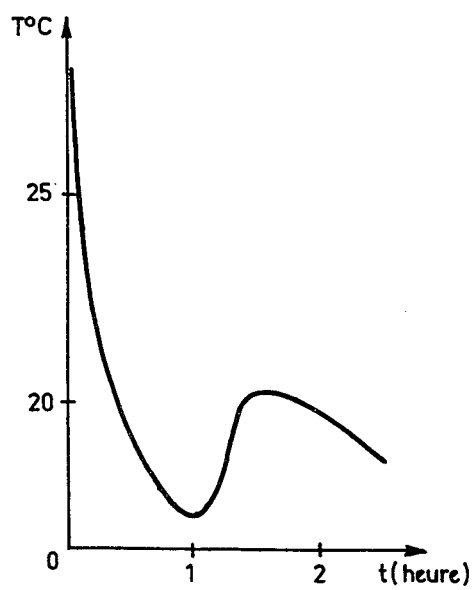
Figure 1H:
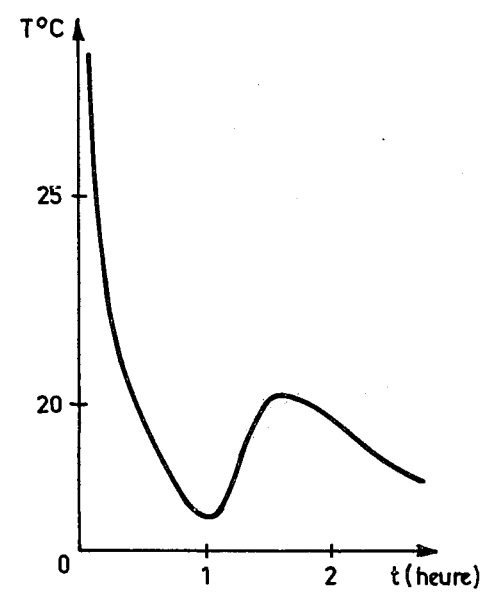

The substitute obtained had good organoleptic properties and was suitable for the preparation of chocolate, for example when mixed in a proportion of 15% with natural cocoa butter. However, it was observed that the compatibility of the cocoa butter substitute of the invention with natural cocoa butter was excellent and would enable the use of a mixture having proportions of substitute higher than 15%. FIGS. 1a to 1h show the cooling curves known as "Prichard curves" obtained for natural cocoa butter and/or the substitute prepared in the example given above. FIG. 1a shows the curve for natural cocoa butter alone. FIG. 1b shows the curve for the substitute of the invention alone. FIGS. 1c to 1h show the curves for mixtures of natural cocoa butter and the substitute comprising 10%, 15%, 20%, 30%, 40% and 70% of substitute respectively. It can be seen that the modifications of the Prichard curve are practically negligible whatever the proportion of the substitute mixed with the natural cocoa butter, which shows that the two products are completely compatible.

Figure 2:
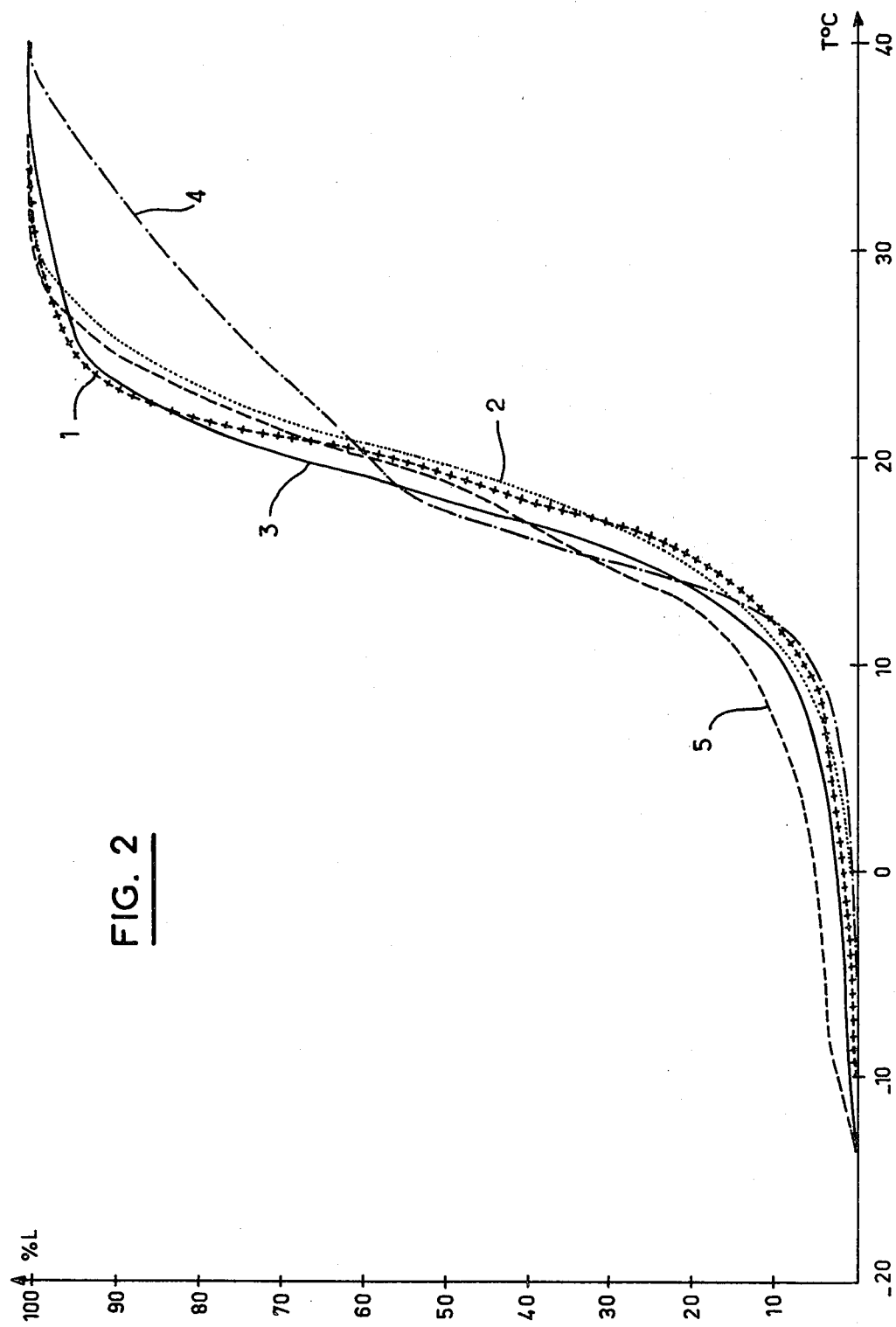
FIG. 2 shows percent liquid vs. temperature for cocoa butter and several cocoa butter substitutes.

FIG. 2 gives a comparison of the curves showing the percentage of liquid as a function of temperature for the natural cocoa butter (curve 1), for the substitute prepared in the above example (curve 5) and for three other substitutes at present available commercially, i.e. the products sold under the tradenames of "COBERINE" (curve 2), "CHOCOLINE" (curve 3), "CALVETTA" (curve 4). It can be seen that there is little difference between curve 1 and curve 5 which constitutes a first indication that the properties of the substitute of the invention are very close to those of natural cocoa butter.

Figure 1I:
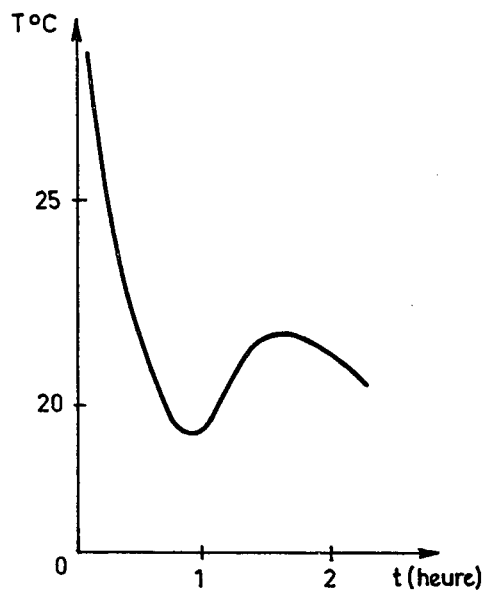
Figure 1J:
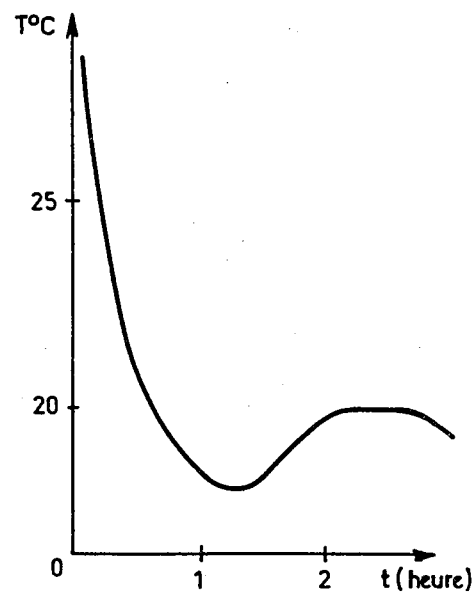
Figure 1K:
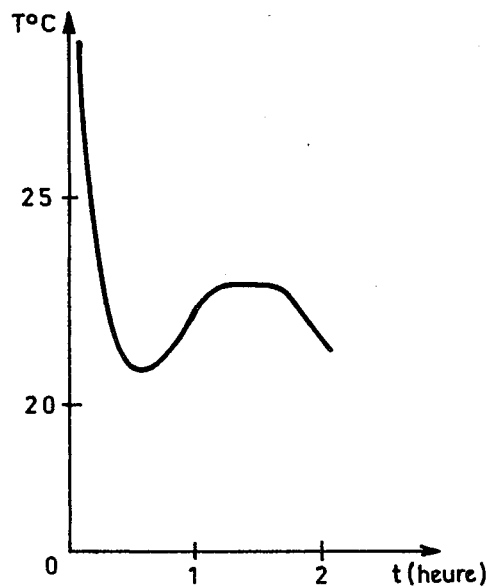

This is further confirmed from a comparison of the Prichard curves of FIGS. 1a and 1b and the Prichard curves of the three other substitutes referred to above. For this purpose, the Prichard curves for the substitutes "COBERINE", "CHOCOLINE" and "CALVETTA" are given in FIGS. 1i, 1j, and 1k respectively.

Figure 3:
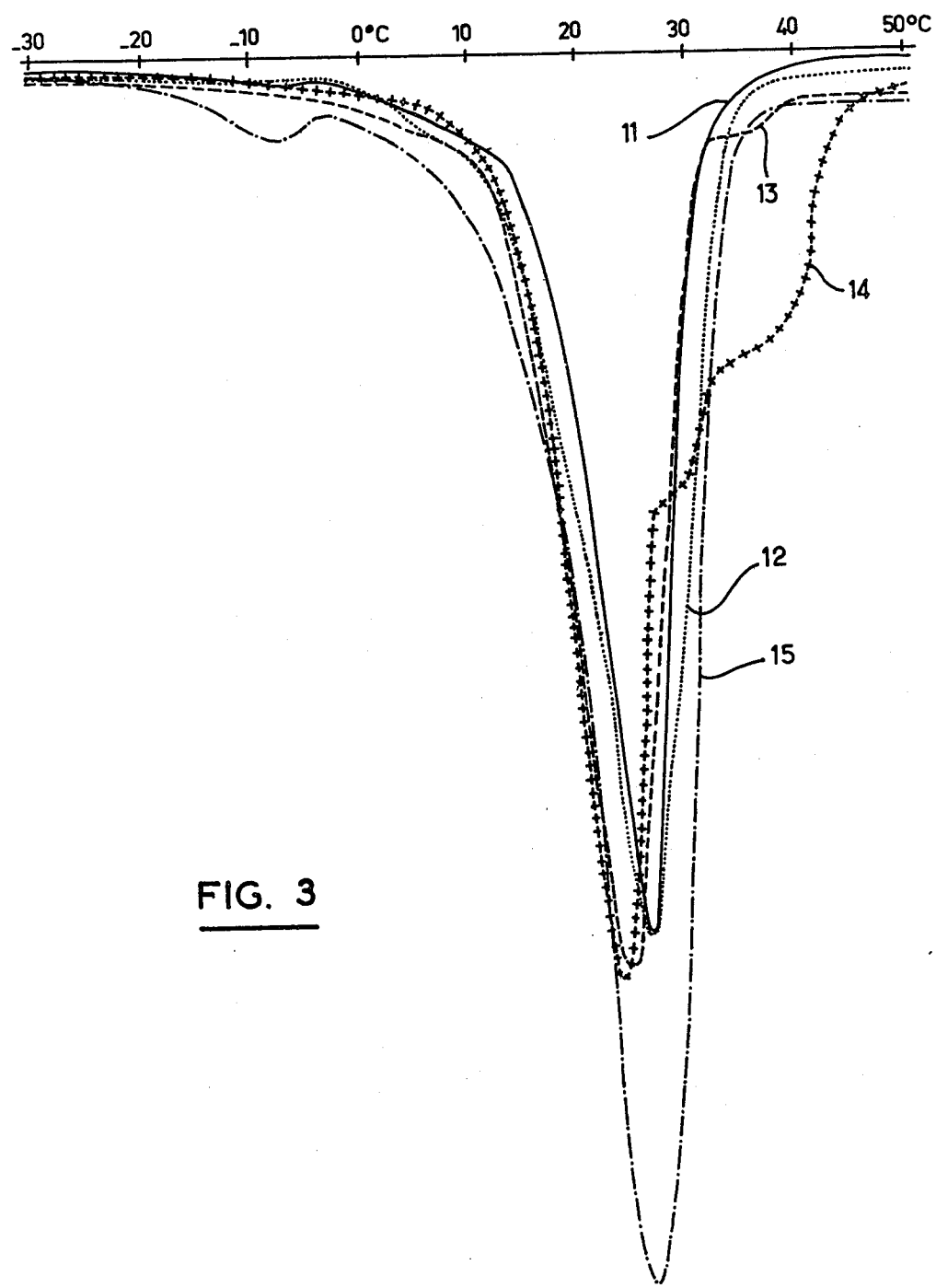
FIG. 3 shows differential calorimetric analysis curves for cocoa butter and several cocoa butter substitutes.

The differential calorimetric analysis curves obtained with a METTLER apparatus under identical analysis conditions were also compared. It is to be noted in respect of these curves that the height of the peaks is a function of the quantity of sample analysed and that only the general shape of the curve and the temperature corresponding to the maxima should be taken into consideration. FIG. 3 shows five curves designated by the reference numerals 11, 12, 13, 14, 15 and relating respectively to natural cocoa butter, to the substitutes known under the tradenames of "coberine", "CHOCOLINE" and "CALVETTA", and to the substitute of the invention as prepared in the above example. Examination of the experimental results shown in FIGS. 1 to 3 shows that the substitute of the invention has physical properties which are extremely close to those of natural cocoa butter and has an excellent mixing compatibility with cocoa butter.

Various modifications may be made within the scope of the invention.

We claim:

1. a method of preparing a cocoa butter substitute, comprising mixing fats consisting essentially of 35 to 45 parts by weight of a fat A having more than 40% by weight of $C_{16}$ and $C_{18}$ fatty acids and selected from the group consisting of shea butter, mango kernel fat, Borneo tallow (Shorea stenoptera, Pentadesma butyracea), sal (Shorea robusta), kokum (Garcinia indica) and mahua (Madhuca latifolia), with 65 to 55 parts by weight of palm oil fraction B containing more than 50% by weight of triglycerides of the palmitic-oleic-palmitine (POP) type and less than 1% by weight of trisaturated triglycerides, to form a mixture, and fractionating said mixture dissolved in a solvent medium by cooling to a temperature effective to precipitate the cocoa butter substitute.

2. The method according to claim 1, wherein said fractionating comprises, mixing 250 to 500 parts by weight of the solvent to 100 parts of said mixture to obtain a substantially homogeneous mixture, and slowly cooling this resulting mixture to a temperature of from $-4°$ C. to $-8°$ C. to precipitate the cocoa butter substitute as a solid fraction.

3. The method according to claim 2, further comprising washing the solid fraction precipitated with a solvent at a temperature of from $-4°$ C. to $-8°$ C., and then deodorizing the solid fraction.

4. The method according to claim 1, wherein fat A is subjected to preliminary treatment comprising at least one of neutralization, washing and decolouration.

5. The method according to claim 4, wherein fat A is shea butter, and wherein the preliminary treatment comprises adding to the shea butter, at a temperature of from 75° C. to 95° C., in an amount of 0.1 to 0.5% by weight of the shea butter, an acid selected from the group consisting of phosphoric acid and acetic acid, then neutralizing with a base, then washing the resulting neutralized paste with water, then liquefying and mixing with 0.1 to 2% by weight of decolouring earth, and then filtering the liquid.

6. The method according to claim 1, wherein the fractionation solvent is selected from the group consisting of hexane and acetone.

7. The method according to claim 1, wherein said solvent for fractionation is added to said mixture with stirring at a temperature of from 25° C. to 45° C.

* * * * *